United States Patent [19]
Muramatsu

[11] Patent Number: 5,282,223
[45] Date of Patent: Jan. 25, 1994

[54] DIGITAL TRANSMISSION CONTROL EQUIPMENT

[75] Inventor: Yoshihiro Muramatsu, Iida, Japan

[73] Assignee: Kabushiki Kaisha Network Supply, Nagano, Japan

[21] Appl. No.: 899,899

[22] Filed: Jun. 17, 1992

[30] Foreign Application Priority Data

Oct. 9, 1991 [JP] Japan .................. 3-290974

[51] Int. Cl.[5] .............. H04L 25/60; H04L 25/64
[52] U.S. Cl. ............................ 375/4; 375/110; 328/164
[58] Field of Search ............ 375/3, 4, 110, 119, 375/106; 307/234; 328/111, 112, 164; 377/20, 260, 265, 269, 521

[56] References Cited

U.S. PATENT DOCUMENTS

| | | | |
|---|---|---|---|
| 4,227,251 | 10/1980 | Kazama et al. ............ | 375/4 |
| 4,456,884 | 6/1984 | Yarborough, Jr. .......... | 375/110 |
| 5,197,082 | 3/1993 | Uda et al. .................. | 375/4 |

FOREIGN PATENT DOCUMENTS

56-136037 10/1981 Japan .

Primary Examiner—Curtis Kuntz
Assistant Examiner—Hai H. Phan

[57] ABSTRACT

The present invention provides a digital transmission control equipment which is capable of getting receiving clock pulses from digital signals with no synchronous signals and regenerating waveforms in a quite short time. The equipment comprises a waveform shaping section for shaping the voltage level and the waveform of coded digital signals received, a timing section including a delay element, an edge detecting circuit, an oscillator, a counter circuit and a reset pulse regenerating circuit, and a waveform regenerating section for regenerating coded digital signals output on the basis of the shaped digital signals.

8 Claims, 4 Drawing Sheets

DIGITAL TRANSMISSION CONTROL EQUIPMENT

BACKGROUND OF THE INVENTION

The present invention relates to a digital transmission control equipment, more precisely relates to a digital transmission control equipment for interchanging digital data, which receives coded digital signals, and corrects waveforms when the coded signals received are transmitted to other units.

A block diagram of a conventional digital transmission control equipment is shown in FIG. 7.

The conventional equipment has a waveform shaping circuit 50, a timing circuit 52 and a waveform regenerating circuit 54.

The wave shaping circuit 50 reforms waveforms of coded digital signals received into shaped digital signals which can be processed in subsequent circuits.

The timing circuit 52 generates receiving clock pulses by Phase Lock Loop (PLL) technology. The timing circuit 52 has a phase comparator 56, a low-pass filter 58, an amplifier 60 and a voltage control oscillator (VCO) 62. The phase comparator 56 compares the phase of the shaped digital signals with that of the output signals of the VCO 62, and outputs an average direct current (DC) voltage which is in proportion to the phase difference therebetween. The low-pass filter 58 removes high frequency noise from the average DC voltage output from the phase comparator 56. The amplifier 60 amplifies the average DC voltage output from the low-pass filter 58 to a prescribed input level of the VCO 62. A cycle time of the central oscillating frequency of the VCO 62 is approximately equal to a cycle time of the coded digital signals.

In case of no input, the VCO 62 runs freely, and adding synchronous signals for detecting phase to the head of the coded digital signals is required to coincide the frequency of the VCO 62 with that of the coded digital signals.

The waveform regenerating circuit 54 synchronizes the shaped digital signals from the waveform shaping circuit 50 with the receiving clock pulses detected by the timing circuit 52, and outputs the shaped digital signals.

Next, the action of the conventional equipment will be explained.

When coded digital signals, including synchronous signals whose level and duty have been disturbed, reach the waveform shaping circuit 50, shaping of the coded digital signals (such as correcting timing of leading and/or trailing edges of the waveform and voltage level) is executed in the waveform shaping circuit 50. The shaped digital signals so shaped by the waveform shaping circuit 50 are input to the timing circuit 52 and the waveform regenerating circuit 54.

In the timing circuit 52, the phase of the synchronous signals added to the shaped digital signals is compared with that of the output of the VCO 62 by the phase comparator 56, and the average DC voltage corresponding to the phase difference therebetween is output. High frequency noise in the average DC voltage is removed by the low-pass filter 58. Then the average DC voltage is amplified by the amplifier 60 and is input to the VCO 62. The oscillating frequency of the VCO 62 is controlled by the average DC voltage input, and the phase of the output (oscillating waves) of the VCO 62 is compared with that of the synchronous signals again. The above described steps are repeated until the frequency of the receiving clock pulses (the output of the VCO 62) equals the frequency of the synchronous signals.

In the waveform shaping circuit 50, the shaped digital signals and the receiving clock pulses are processed so as to generate coded digital signals synchronized with the receiving clock pulses. The coded digital signals so synchronized are sent to transmission routes.

The conventional digital transmission control equipment has, however, the following disadvantage:

Since the PLL circuit is included in the timing circuit 52, the synchronous signals for synchronizing the frequency of the VCO in the PLL with that of the coded digital signals must be added the head of the coded digital signals. Therefore, it takes a relatively long time to change the frequency of the VCO to that of the synchronous signals.

Because of this disadvantage, in the case of, for example, an optical communication system which must have a plurality of control equipment provided at regular intervals, or in another case of many control equipment provided in a transmission route, so much time is spent in each control equipment that transmission efficiency is lowered.

SUMMARY OF THE INVENTION

An object of the present invention is to provide a digital transmission control equipment which is capable of detecting the receiving clock pulses without addition of synchronous signals, and spending quite a short time for waveform regeneration.

To achieve this object, the present invention has the following structures:

a digital transmission control equipment for receiving coded digital signals which are sent via a digital transmission route, and regenerating the same to interchange, which comprises:

a waveform shaping section for receiving the coded digital signals sent via the digital transmission route, and shaping the voltage level and the waveform thereof;

a timing section including:

delay means for delaying digital signals shaped by the waveform shaping section a prescribed time, and outputting the delayed shaped digital signals as delay signals;

an edge detecting circuit for detecting one edge of the delay signals, and outputting a starting pulse;

an oscillator for outputting driving pulses with prescribed frequency;

a counter circuit for counting the driving pulses, outputting receiving clock pulses, whose cycle time is equal to the time length of one bit of the coded digital signals, resetting counted number of the driving pulses and restarting to count the same upon receiving the starting pulse, and outputting the receiving clock pulses; and a reset pulse regenerating circuit for detecting an edge of the receiving clock pulses, and generating a reset pulse with prescribed pulse width; and a waveform regenerating section for regenerating the coded digital signals on the basis of the shaped digital signals, the delay signals and the reset pulse, and outputting the same to the digital transmission route.

In this equipment, the coded digital signals are converted by the waveform shaping section into shaped digital signals. The shaped digital signals are input to the timing section and the waveform regenerating section. In the timing section, the shaped digital signals are delayed a prescribed time by the delaying means. The counter, which outputs the receiving clock pulses whose cycle time is equal to the time length of one bit of the coded digital signals, is synchronized with the delay signals. Furthermore, the reset pulse is generated by the reset pulse generating circuit on the basis of the receiving clock pulse.

In the waveform regenerating section, based on the shaped digital signals and the delay signals, the digital signals are regenerated and sent to the digital transmission route.

In the digital transmission control equipment of the present invention, one edge of the coded digital signals is detected by the timing section. The action of the counter, whose cycle time is the same as the time length of one bit signal of the coded digital signals, is synchronized with the one edge detected, so that the receiving clock pulses can be detected and the reset pulses can be generated. Therefore, addition of synchronizing signals to the head of the coded digital signals is not required. By eliminating synchronizing signals, the coded digital signals are regenerated with only the short delay caused by the delay means, so that the total processing time of the equipment is reduced.

BRIEF DESCRIPTION OF THE DRAWINGS

The present invention will become more fully understood from the detailed description given hereinbelow and the accompanying drawings, which are given by way of illustration only and thus are not limitative of the present invention and wherein.

DETAILED DESCRIPTION OF PREFERRED EMBODIMENT

A preferred embodiment of the present embodiment will now be described in detail with reference to the accompanying drawings.

Figure 1:
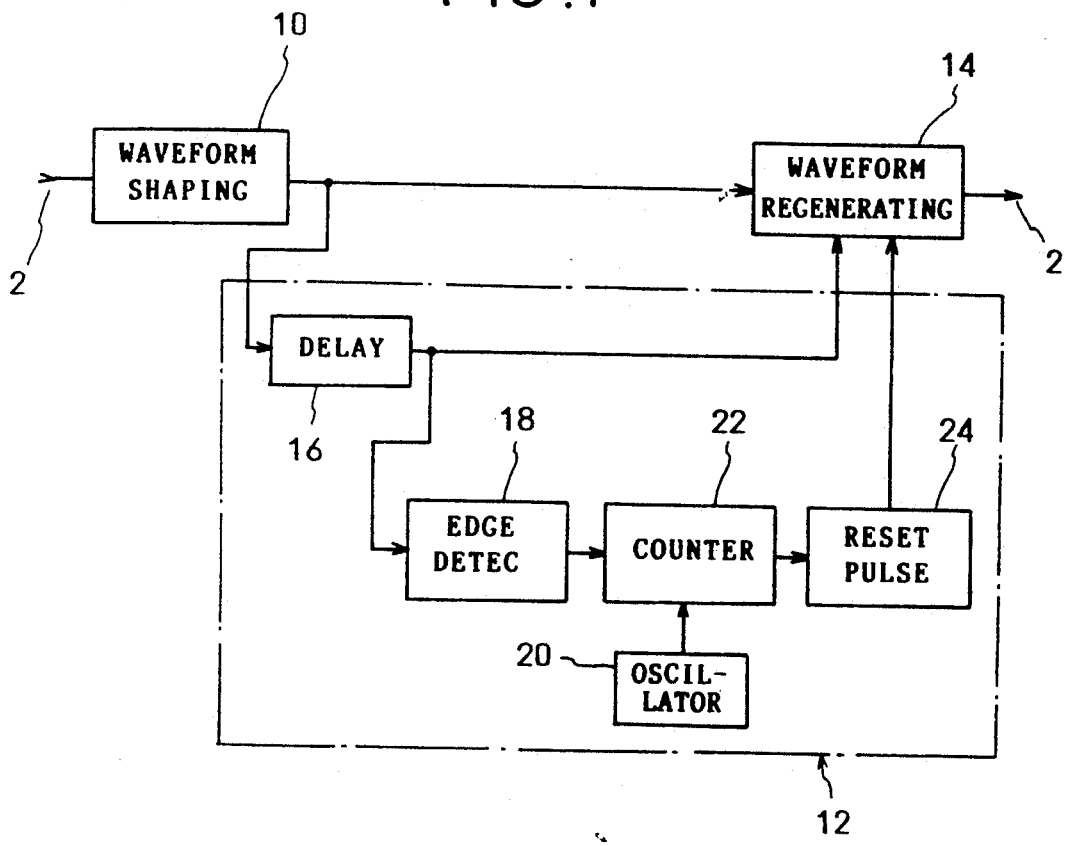
FIG. 1 is a block diagram of an embodiment of the digital transmission control equipment of the present invention.
Figure 2:
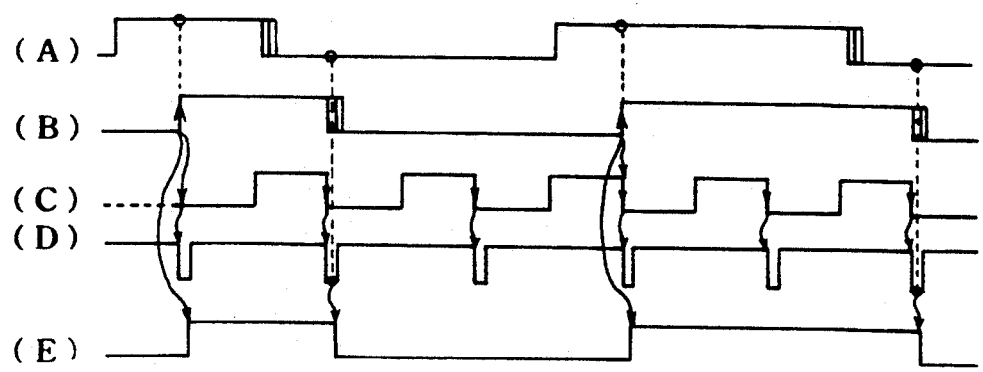
FIG. 2 is a timing chart of each section thereof.

FIG. 1 is a block diagram of an embodiment of the digital transmission control equipment of the present invention, and FIG. 2 is a timing chart of each section thereof.

First, the structures will be explained.

The digital transmission control equipment has a waveform shaping section 10, a timing section 12 and a waveform regenerating section 14. The equipment is provided in the midsection of a digital transmission route 2 formed of optical fiber cables.

Figure 3:
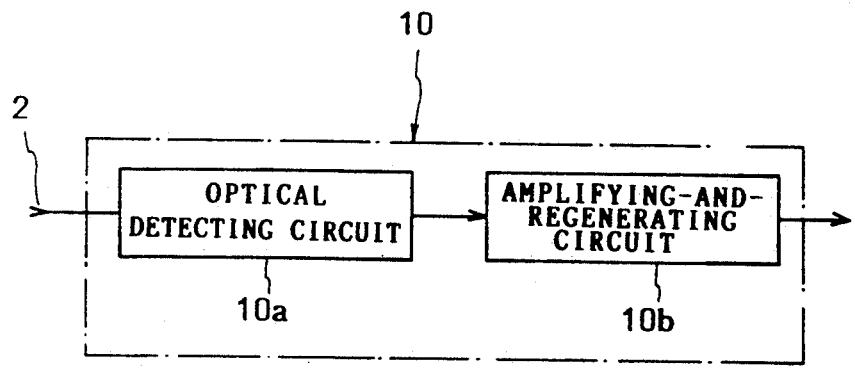
FIG. 3 is a detailed block diagram of the waveform shaping section.
Figure 4:
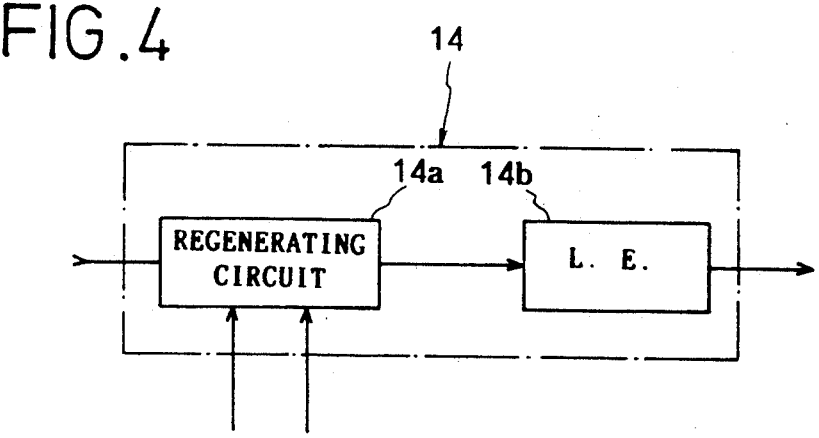
FIG. 4 is a detailed block diagram of the waveform regenerating section.
Figure 5:
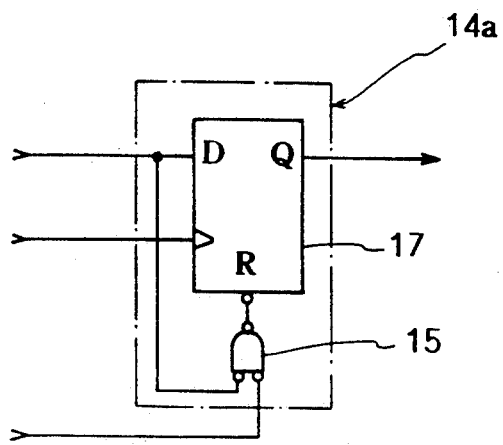
FIG. 5 is a circuit diagram of the waveform regenerating circuit shown in FIG. 4.

The waveform shaping circuit 10 has a photo detecting circuit 10a, which changes optical signals sent via the transmission route 2 into electric signals, and an amplifying-and-regenerating circuit 10b which amplifies and regenerates the output of the photo detecting circuit 10a. With this structure, the waveform shaping circuit 10 shapes the received coded digital signals into shaped digital signals which can be processed in latter circuits in the equipment (see FIG. 3).

The timing section 12 has, as shown in FIG. 1, a delay means 16, an edge detecting circuit 18, an oscillator 20, a counter 22 and a reset pulse regenerating circuit 24. The timing section 12 receives the shaped digital signals (A), and generates receiving clock pulses (C). Furthermore, on the basis of the receiving clock pulses (C), the timing section 12 generates reset pulses (D) which are then sent to the waveform regenerating section 14.

The delay means 16 delays the shaped digital signals (A) a prescribed time without depending on a clock pulse, and outputs the delayed signals as delay signals (B). The delay means may be, for example, a silicon delay line.

Figure 6:
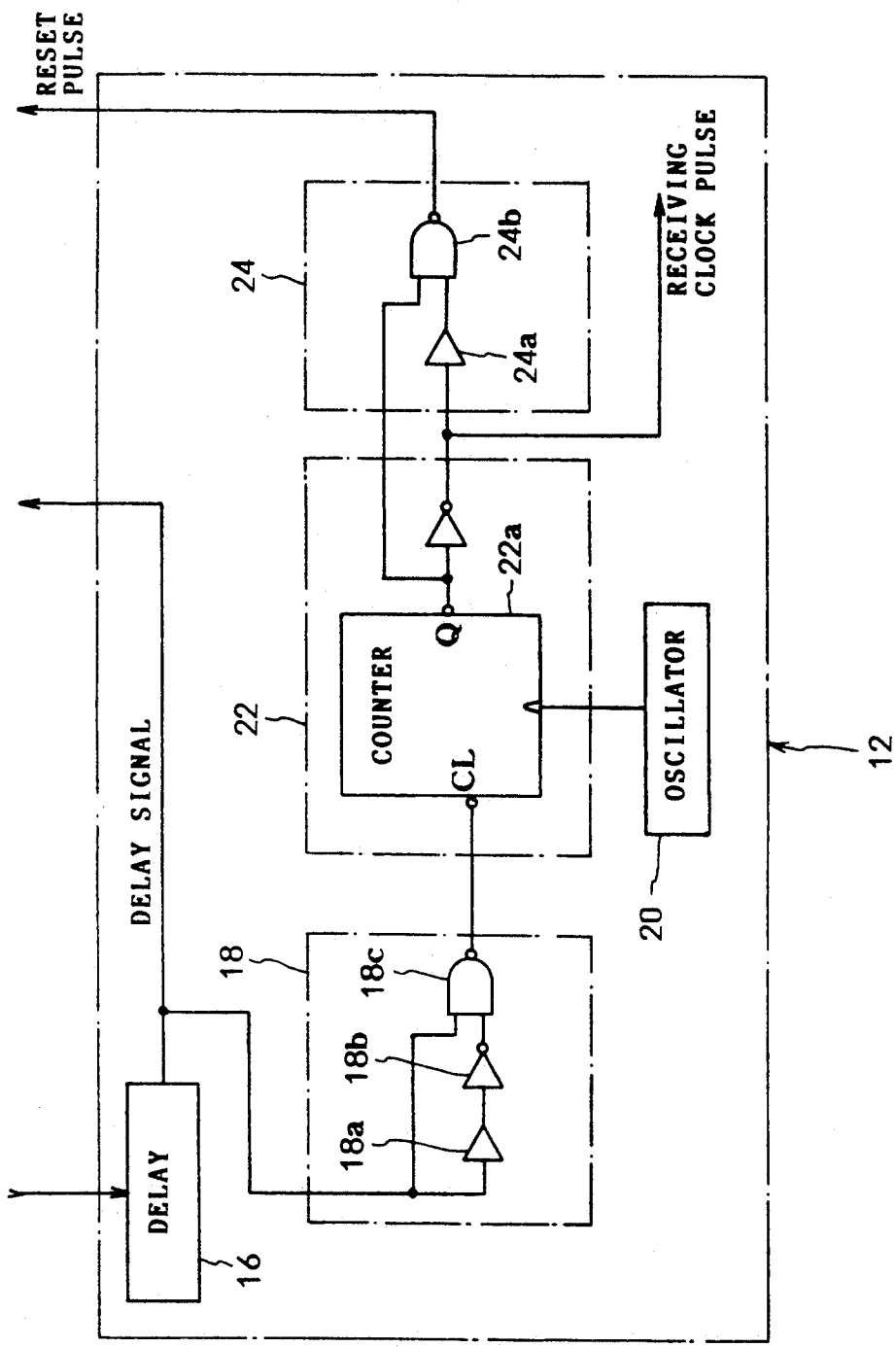
FIG. 6 is a detailed block diagram of the timing section.
Figure 7:
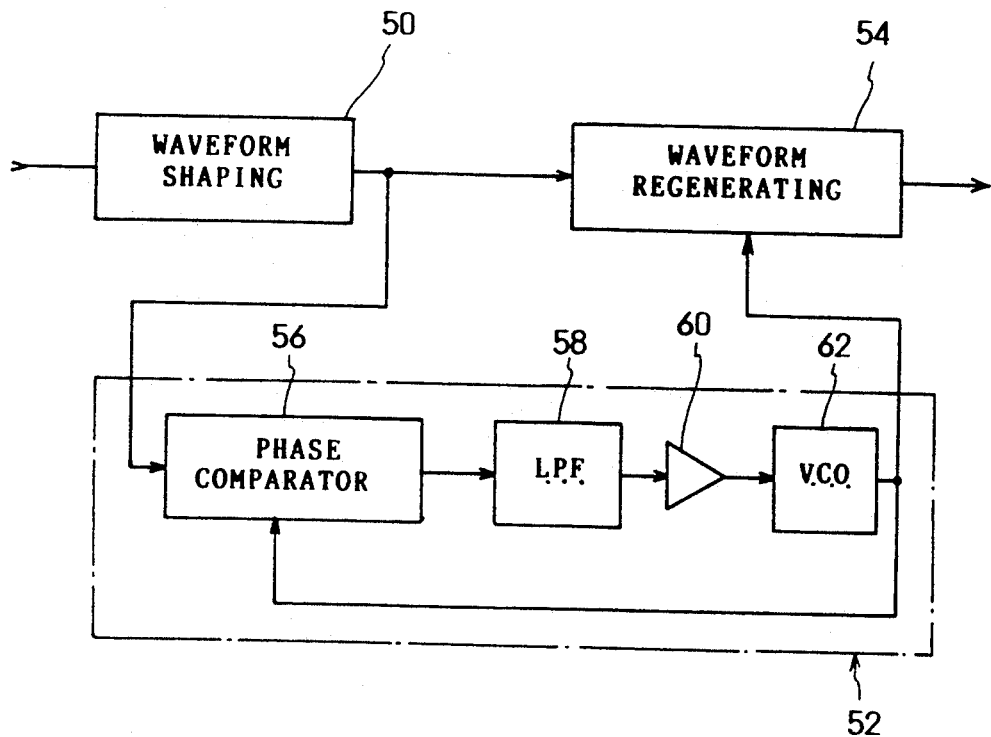
FIG. 7 is a block diagram of the conventional digital transmission control equipment.

The edge detecting circuit 18 has a buffer gate 18a to which the delay signals (B) are input, an inverter 18b to which the output signals of the buffer gate 18a are input and a NAND gate 18c to which the delay signals and the output signals of the inverter 18b are input (see FIG. 6). The edge detecting circuit 18 detects the leading edge of the delay signals (B) so as to generate start pulses with a prescribed pulse width.

The oscillator 20 has a crystal oscillating element to oscillate precisely at a fixed frequency. The output of the oscillator 20 is the driving pulse of the counter 22.

The counter 22 has a four-bit binary counter 22a, which has a clock terminal and nonsynchronizing clear terminal as an input terminal for start pulses (see FIG. 6). With this structure, the driving pulses of the oscillator 20 are counted. When the start pulse is input, the counter 22 clears the counted value and restarts the count, so that the receiving clock pulses (C), whose cycle time is the same as the time length of one bit of the coded digital signals, can be output therefrom.

The reset pulse generating circuit 24 has a buffer gate 24a to which the receiving clock pulses (C) are input and a NAND gate 24b to which the output signals of the buffer gate 24a and the inverted signals of the receiving clock pulses (C) (see FIG. 6) are input. The reset pulse generating circuit 24 outputs reset pulses (D), which have a prescribed pulse width and are synchronized with the trailing edges of the receiving clock pulses (C).

The waveform regenerating section 14 has a regenerating circuit 14a for regenerating the coded digital signals (E), which are coded on the basis of the shaped digital signals (A), the delay signals (B) and the reset pulses (D), and a light emitting circuit 14b for changing the coded digital signals (E) regenerated by the regenerating circuit 14a into optical signals and sending them to the optical fiber route 2.

More precisely, the regenerating circuit 14a has an OR gate 15 and a delay flip flop (D-FF) 17. The shaped digital signals (A) and the reset pulses (D) are input to the OR gate 15. The shaped digital signals (A) are also input to a data input terminal of the D-FF 17, the delay signals (B) are input to a clock terminal thereof, and the output of the OR gate 15 is input to a nonsynchronizing reset terminal thereof.

In the waveform regeneration section 14, due to the shaped digital signals (A), the delay signals (B) and the reset pulses (D), the duty of the shaped digital signals (A) is corrected to synchronize with the leading edge of the delay signals (B) whose bit structure is the same as the shaped digital signals (A).

Successively, the action of the equipment will be explained.

The voltage level and duty of digital signals sent via the transmission route 2 are shaped by the waveform shaping section 10 so as to make the shaped digital signals (A). The shaped digital signals (A) are sent to the timing section 12 and the waveform regenerating section 14.

In the timing section 12, the shaped digital signals (A) are delayed a prescribed time to make the delay signals (B). The delay signals (B) are sent to the waveform regenerating section 14. The edge detecting circuit 18 generates pulses which are synchronized with the leading edge of the delay signals (B). Upon receiving said pulses generated from the edge detecting circuit 18, the counter 22, which counts with a cycle time equal to the time length of one bit of the coded digital signals, clears the last counted number and begins to count again. The receiving clock pulses (C), which are the output of the counter 22, are synchronized with the leading edge of the coded digital signals. And the receiving clock pulses (C) are input to the reset pulse generating circuit 24 to generate the reset pulses (D) on clearing of the counted number of the counter 22. The reset pulses (D) are input to the waveform regenerating section 14.

In the waveform regenerating section 14, the voltage level High (H) and Low (L) of the coded digital signals (E) is coincided with that of the shaped digital signals (A) synchronized with the leading edge of the delay signals (B). Upon receiving the reset pulse (D), which is synchronized with the trailing edge of the receiving clock pulses (C), the levels H and L of the shaped digital signals (A) are also checked. If the H/L levels of the shaped digital signals (A) are inverted with respect to that of the shaped digital signals (A) corresponding to the leading edge of the latest delay signal (B), the H/L levels of the coded digital signals (E) are altered to coincide with that of the shaped digital signals (A).

By the above described actions, the coded digital signals are delayed a prescribed time by the delay means 16. In the present embodiment, the delay time is defined as a half of one cycle time of the receiving clock pulse (C); upon receiving the coded digital signals, the waveform is almost simultaneously shaped, and the shaped signals are output as the coded digital signals (E). The timing of the leading edge of the coded digital signals (E) is equal to that of the delay signals (B). Therefore, the timing of the leading edge of the coded digital signals (E) has no relationship to the driving pulses of the oscillator 20, so that no jitters caused by the driving pulses are transmitted to the vicinity of the leading edge of the coded digital signals (E).

The preferred embodiment has been described, but the present invention is not limited to the above described embodiment. Many modifications, for example, the edges of the coded digital signals and the delay signals for synchronization may be the trailing edges thereof instead of the leading edges, can be allowed without deviating from the scope of the invention.

What is claimed is:

1. A digital transmission control equipment for receiving coded digital signals, which are sent via a digital transmission route, and regenerating said coded digital signals,
   comprising:
   a waveform shaping section for receiving the coded digital signals sent via said digital transmission route, and shaping a voltage level and a waveform thereof;
   a timing section including:
      delay means for delaying shaped digital signals shaped by said waveform shaping section for a prescribed time, and outputting the delayed shaped digital signals as delayed signals;
      an edge detecting circuit for detecting one of edges of the delayed signals, and outputting a starting pulse;
      an oscillator for outputting driving pulses with a prescribed frequency;
      a counter circuit for counting the driving pulses, outputting receiving-clock pulses whose cycle time is equal to the time length of one bit of the coded digital signals, resetting counted number of the driving pulses and restarting a count of the same upon receiving the starting pulse and
      a reset pulse regenerating circuit for detecting an edge of the receiving-clock pulses, and generating a reset pulse with a prescribed width; and
   a waveform regenerating section for regenerating the coded digital signals on the basis of the shaped digital signals, the delayed signals and the and the reset pulse, and outputting said coded digital signals to said digital transmission route.

2. The digital transmission control equipment according to claim 1,
   wherein said digital transmission route is an optical fiber cable.

3. The digital transmission control equipment according to claim 2,
   wherein said waveform shaping section comprises:
   a photo detecting circuit for changing photo signals, which are sent via said optical fiber cable, to electric signals; and
   an amplifying-and-regenerating circuit for amplifying and regenerating A.

4. The digital transmission control equipment according to claim 2,
   wherein said waveform regenerating section comprises:
   a regenerating circuit for regenerating the coded digital signals which are coded on the basis of the shaped digital signals, the delayed signals and the reset pulse; and
   a light emitting circuit for changing the regenerated coded digital signals, which are regenerated by said regenerating circuit, to optical signals, and sending the optical signals from electric signal to said optical fiber cable.

5. The digital transmission control equipment according to claim 4,
   wherein said regenerating circuit comprises:
   an OR gate to which the shaped digital signals and the reset pulse are input; and
   a delay flip flop (D-FF) having a nonsynchronizing reset terminal, a data input terminal and a clock terminal, wherein the shaped digital signals are input to the data input terminal, the delayed signals are input to the clock terminal and the output of said OR gate is input to the nonsynchronizing reset terminal.

6. The digital transmission control equipment according to claim 1,
   wherein said edge detecting circuit comprises:

a buffer gate to which the delayed signals are input;
an inverter to which the output of said buffer gate is input; and
a NAND gate to which the delayed signals and the output of the inverter are input,
whereby said edge detecting circuit generates the starting pulse synchronizing with the leading edge of the delayed signals.

7. The digital transmission control equipment according to claim 1,
wherein said counter circuit is a four-bit binary counter having a clock terminal to which the driving pulses are input and a nonsynchronizing clear terminal to which the starting pulse is input.

8. The digital transmission control equipment according to claim 1,
wherein said reset pulse regenerating circuit includes a buffer gate to which the receiving-clock pulses are input and a NAND gate to which the output signals of said buffer gate and the inverted signals of the receiving clock pulses are input, said reset pulse regenerating circuit generates the reset pulse which is synchronized with the trailing edge of the receiving-clock pulses.

* * * * *

UNITED STATES PATENT AND TRADEMARK OFFICE
CERTIFICATE OF CORRECTION

PATENT NO. : 5,282,223
DATED : January 25, 1994
INVENTOR(S) : Yoshihiro MURAMATSU It is certified that error appears in the above-indentified patent and that said Letters Patent is hereby corrected as shown below:

On the Title Page, item [54] and column 1, line 3, after "EQUIPMENT" add --WITH TIMING DETECTION CIRCUIT--

Signed and Sealed this

Twelfth Day of July, 1994

Attest:

BRUCE LEHMAN

Attesting Officer     Commissioner of Patents and Trademarks